US006993003B2

United States Patent
Huber

(10) Patent No.: US 6,993,003 B2
(45) Date of Patent: Jan. 31, 2006

(54) METHOD OF FINDING THE POWER PARTS OF THE CODE OF A CDMA SIGNALS

(75) Inventor: Johann Huber, Markt Schwaben (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 853 days.

(21) Appl. No.: 09/970,300

(22) Filed: Oct. 3, 2001

(65) Prior Publication Data

US 2002/0085522 A1 Jul. 4, 2002

(30) Foreign Application Priority Data

Nov. 14, 2000 (DE) ................................ 100 56 258

(51) Int. Cl.
*H04B 7/216* (2006.01)
(52) U.S. Cl. ..................................... 370/335
(58) Field of Classification Search ................ 370/320, 370/335, 342; 375/130, 141, 146, 260
See application file for complete search history.

(56) References Cited

U.S. PATENT DOCUMENTS

| | | | | |
|---|---|---|---|---|
| 6,028,884 A | * | 2/2000 | Silberger et al. | 375/130 |
| 6,747,963 B1 | * | 6/2004 | Park et al. | 370/335 |
| 6,804,264 B1 | * | 10/2004 | Song | 370/500 |
| 6,868,075 B1 | * | 3/2005 | Narvinger et al. | 370/335 |

FOREIGN PATENT DOCUMENTS

| | | |
|---|---|---|
| DE | 197 33 336 A1 | 2/1999 |
| DE | 198 10 285 A1 | 9/1999 |
| DE | 199 55 564 A1 | 5/2000 |
| GB | 2 338 378 A | 12/1999 |
| JP | 00134180 A | 5/2000 |

OTHER PUBLICATIONS

Bocholt, "UTRA Physical Layer Description TDD Parts For Public Operation", Tdoc 120/98, May 1998.
Turin, "UTRA Physical Layer Description FDD Parts", Tdoc SMG2 UMTS-LI 221/98, Jun. 1998.

* cited by examiner

*Primary Examiner*—Man U. Phan
*Assistant Examiner*—Toan Nguyen
(74) *Attorney, Agent, or Firm*—McDermott Will & Emery LLP

(57) ABSTRACT

A method of determining the power parts of the codes of a CDMA signal transmitted in different time slots, which includes a pilot channel and at least one dedicated physical channel. The pilot channel and the dedicated physical channels are assigned different orthogonal codes, and the time slots of the dedicated physical channels can be shifted in time. The method includes determining a momentary power part as a function of time in the raster of time slots of the pilot channel if the orthogonal code is active, and determining a mean power part using the length of the time slot of the pilot channel and displaying the mean power part as a function of the time in the raster of time slots of the pilot channel if the orthogonal code is not active.

4 Claims, 3 Drawing Sheets

METHOD OF FINDING THE POWER PARTS OF THE CODE OF A CDMA SIGNALS

BACKGROUND OF THE INVENTION

The invention concerns a method of finding the power parts of the code of a CDMA (Code Division Multiplex Access signal that is transmitted. CDMA signals are used particularly in third-generation cellular phone standards, for example in a standard in Specification "3G TS 25.211 V3.3.0 (2000-06) $3^{rd}$ Generation Partnership Project; Technical Specification Group Radio Access Network; Physical Channels and Mapping of Transport Channels onto Physical Channels (FDD), Release 1999." Please see Pages 17 and 18 of the above-mentioned standard for the timing relevant to this invention in particular.

Various problems occur in finding and showing the power parts of the different orthogonal codes transmitted at the same time, and they will be described briefly below using FIGS. 1 to 3.

FIG. 1 shows a tree with branches for producing various orthogonal codes in order to give a better understanding of the invention. It shows various code classes, CC, which have different spreading factors SF. The spreading factor SF identifies in how many chips (transmission units) a symbol will be spread. The codes in a certain code class CC are orthogonal to one another, i.e., linearly independent when overlapped. This is also true of codes in different code classes, if the codes in code classes higher or lower on the same branch of the tree are not used. This is explained by the example in FIG. 1.

In the scheme 1 for producing different orthogonal codes shown in FIG. 1, the procedure is that the code of the lower code class is repeated once at each branch point and in one branch again unchanged and in the other branch repeated inverted. This way, 16 orthogonal codes in code class CC4 can be produced with the spreading factor SF=16. The 16 codes in code class CC4 can all be used at the same time. But in many transmissions, it is not necessary to use a spreading factor of SF=16, so codes in lower code classes are used. But codes in a lower code class cannot be used that are in the tree under an active code in a higher code class, since the codes would then not be orthogonal. For example, if code 0011110011000011 in code class CC4 is used, codes 00111100 in code class CC3 and 0011 in code class CC2 and code 00 in code class CC1 cannot be used, since they would not be orthogonal to code 0011110011000011. But if the power of all codes in code class CC3 is determined, for example, an alias power (apparent power) occurs for the non-active code 00111100 which is produced by the active code 0011110011000011 in code class CC4.

FIG. 2 shows the timing behavior of the different channels. There is a difference between a pilot channel CPICH (Common Pilot Channel) and several transmission channels DPCH (Dedicated Physical Channel). All CPICH and DPCH channels use different orthogonal codes, which do not necessarily have to be from the same code class and thus generally have different spreading factors. The pilot channel CPICH and the dedicated physical channels DPCH are broken down into different time slots, Slot 0, Slot 1, ..., Slot 14.

As can be seen in FIG. 2, the slots of each dedicated physical channel DPCH are shifted in relation to the pilot channel CPICH in steps of 256 chips, whereby the maximum timing offset is one frame.

The power within one channel is changed by the "closed loop power control" at the beginning of a pilot sequence, which is cross-hatched in FIG. 3. Depending on the slot format, the pilot sequences are of different lengths (between 1 and 8 symbols, in some so-called "compressed modes" even 16 symbols). The length of the pilot sequence also changes depending on the spreading factor SF. Thus, the power in the individual dedicated physical channels DPCH is changed at different times, even if the timing offset of the respective dedicated physical channels DPCH is zero in relation to the pilot channel CPICH. The times when the power in the dedicated physical channels DPCH changes thus depends, on one hand, on the length of the pilot sequence used in that dedicated physical channel DPCH and, on the other, the timing offset of that dedicated physical channel in relation to the pilot channel CPICH.

A certain CPICH slot is selected to find and show the power parts of a certain code in a certain code class CC (a so-called CDP diagram). The power of the individual dedicated physical channels DPCH can change anywhere in the slot. The power can also change at several places within the slot if several active codes in a higher code class are mapped in an inactive code in a certain code class. For example, if the codes in code class CC3 in FIG. 1 are studied, code 01011010 in code class CC3 is not active, but codes 0101101001011010 and 0101101010100101 in code class CC4 are active, so these codes in code class CC4 are mapped in code 01011010 in code class CC3.

If the conditions explained in FIGS. 1 and 2 are not considered, it leads to incorrect, distorted power values when finding the power parts.

SUMMARY OF THE INVENTION

The problem of the invention is therefore based on providing a method with which the power parts of a code of a CDMA signal of several dedicated physical channels whose slots can be shifted in relation to a pilot channel can be determined, whereby it is possible both to determine the power part of the active codes and also to determine the alias power parts of inactive codes that are produced by codes in higher code classes.

This problem is solved by the features in claim 1. The subclaims contain advantageous variations of the invention.

The invention proposes differentiating between active codes and inactive codes. If a code is active, the power part of that code at the moment, for which the mean has not been taken, is displayed as a function of the time. If the code selected is not active, the mean power part over the length of the slot of the pilot channel is taken and the mean power found is displayed in the raster of the slot of the pilot channel.

BRIEF DESCRIPTION OF THE DRAWINGS

One example of embodiment of the invention will be described in greater detail below with reference to the drawings.

DETAILED DESCRIPTION OF THE INVENTION

Figure 1:
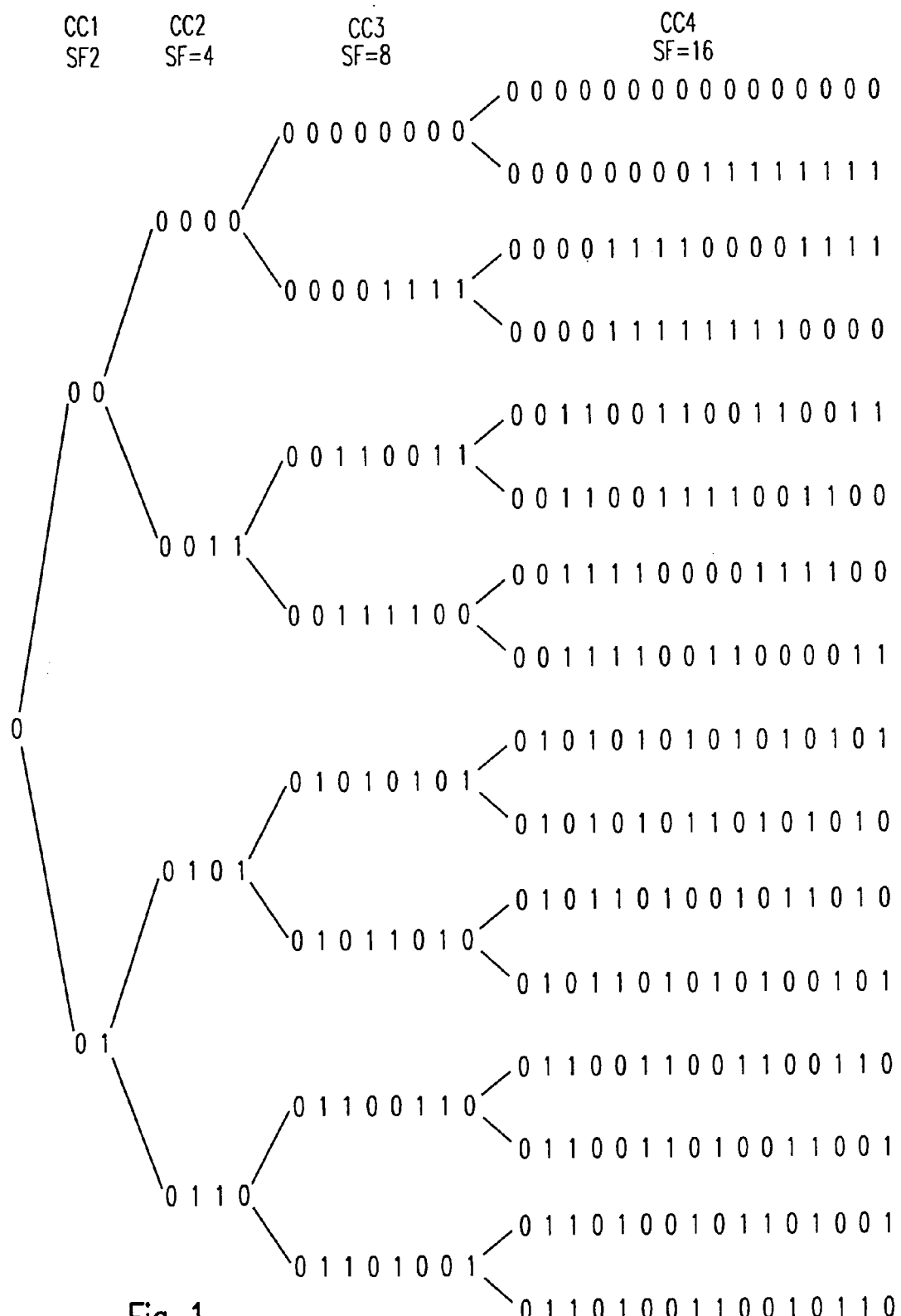
FIG. 1 shows a diagram to explain the production of orthogonal codes.
Figure 2:
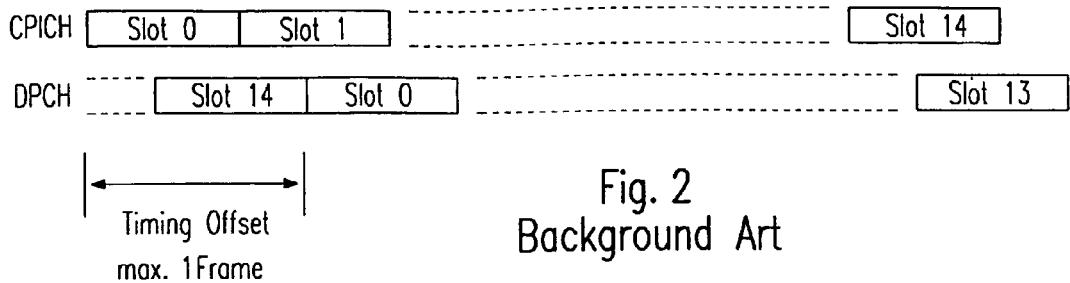
FIG. 2 shows a diagram to explain the timing offset of the dedicated physical channel DPCH in relation to the pilot channel CPICH.
Figure 4:
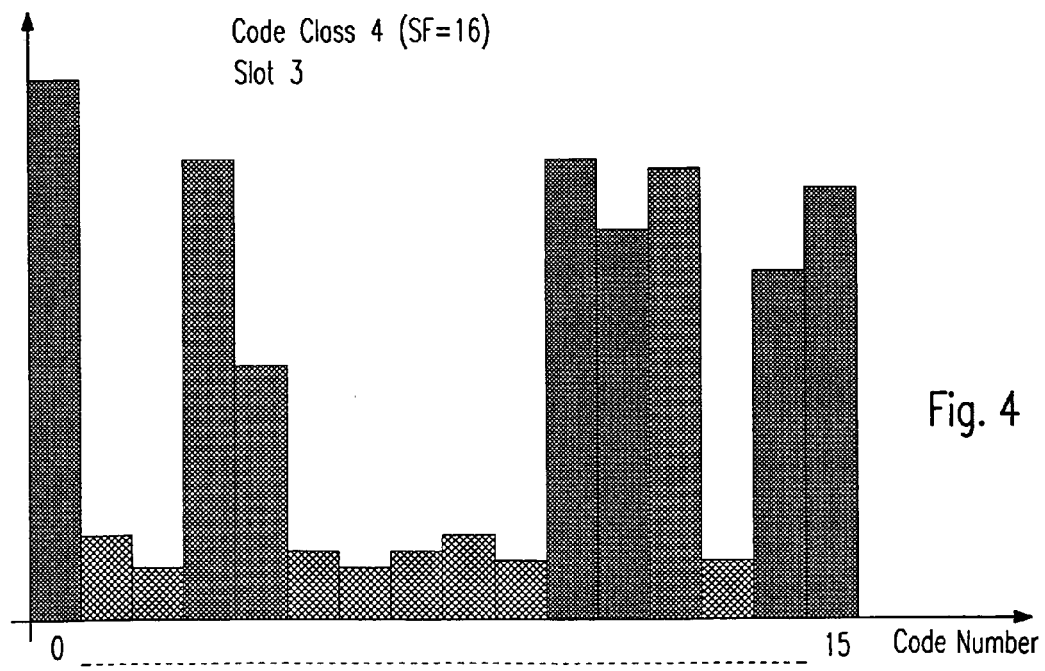
FIG. 4 shows a so-called CDP diagram, i.e., a view of the power parts of the code as a function of the code number.

FIG. 4 shows the mean power part of the code as a function of the code number for code class CC4, i.e. a spreading factor SF=16. It thus shows the mean power part of the orthogonal code in code class CC4 shown as an example in FIG. 1 for a certain CPICH time slot. The mean of the respective power part of the code is taken using the length of the selected slot in the time raster of the pilot channel CPICH, i.e., in this view, there is no difference between active codes and inactive codes, but in each case the mean power is found over the length of the slot of the pilot channel CPICH. If the power changes during the length of the time slot of the pilot channel CPICH, the mean power is displayed.

The codes shown dark gray in FIG. 4 contain an active channel. The codes shown medium gray are inactive. There is therefore an alias power part for these codes that comes from the codes in a higher code class (CC5, CC6 or higher), whereby codes in this higher code classes are active. The codes shown light gray in FIG. 4 are not active; and no codes in higher code classes that are mapped in this code are active.

Figure 5:
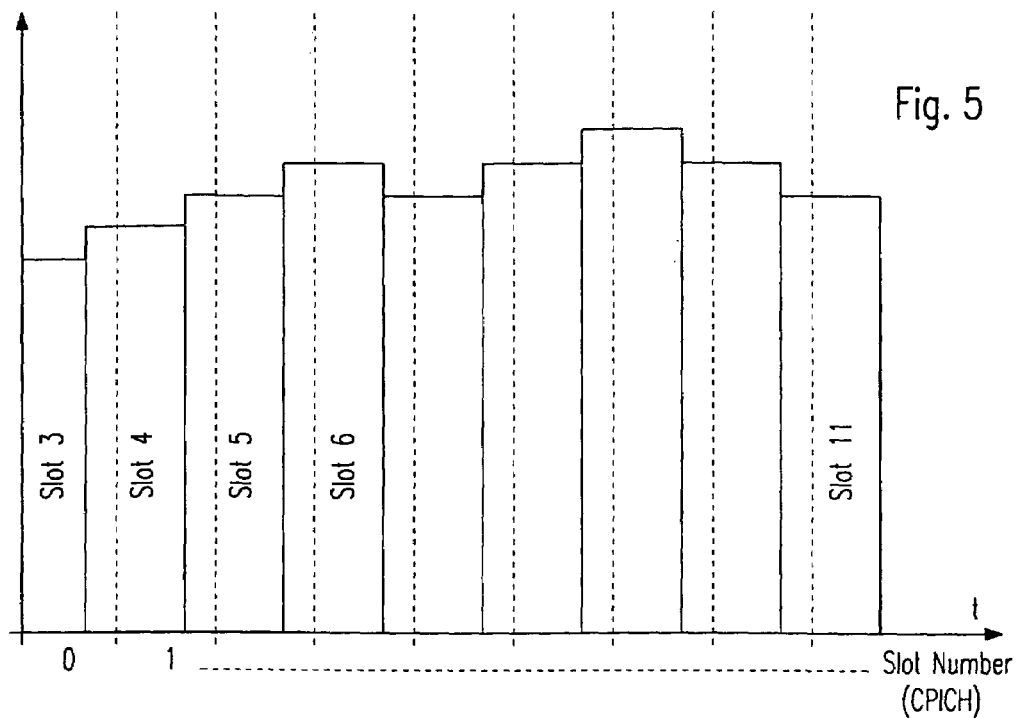
FIG. 5 shows the power parts of a certain active code as a function of the slot number or time.
Figure 6:
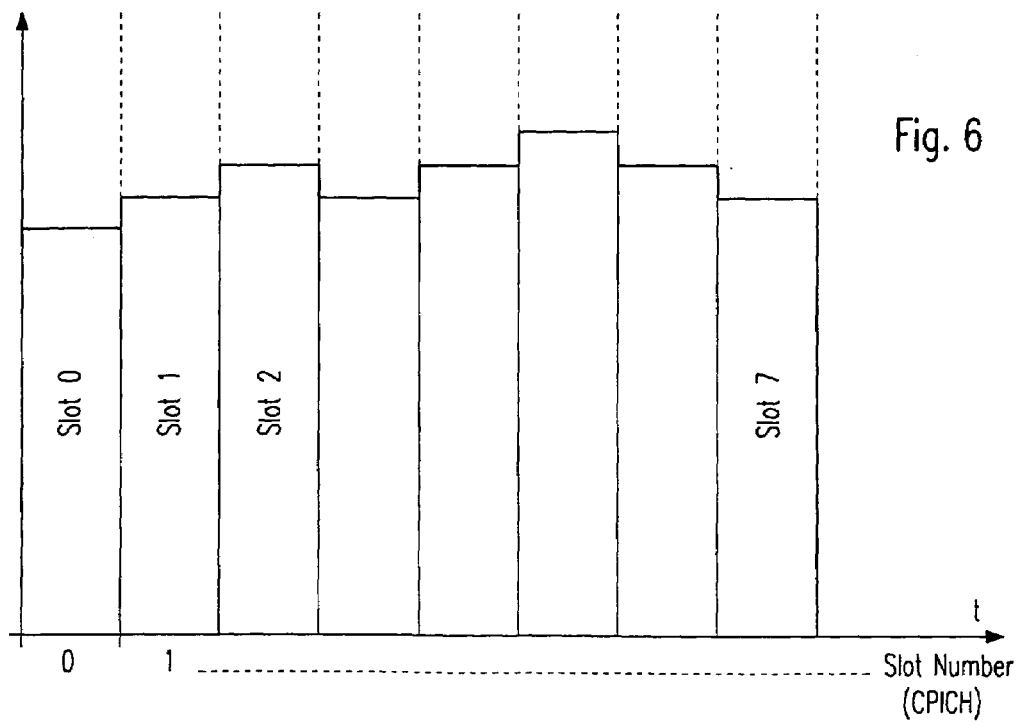
FIG. 6 shows the power parts of a certain inactive code as a function of the slot number or time.

FIGS. 5 and 6 show the mean power as a function of the slot number of the pilot channel CPICH and as a function of the time t. According to the invention, there is no differentiation made between active codes and inactive codes in this determination of power and view. FIG. 5 shows the case of an active code, and FIG. 6 for an inactive code.

Figure 3:
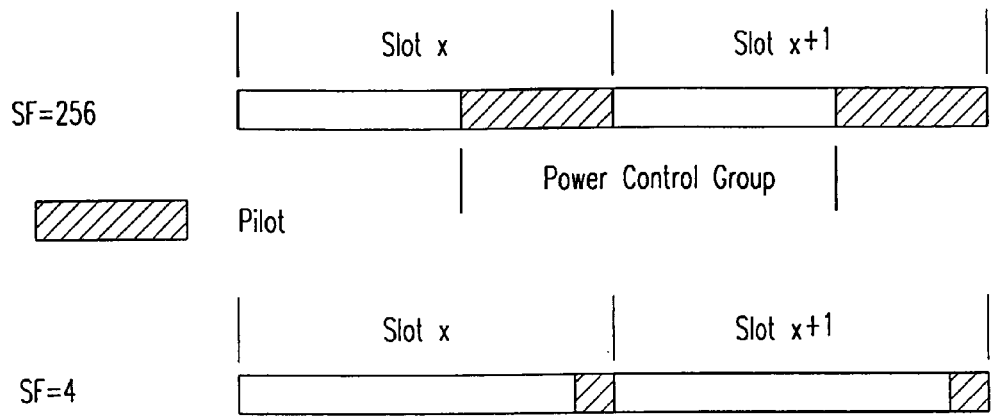
FIG. 3 shows a diagram to explain the position of the pilot sequences at the beginning of which a power change can take place.

As shown in FIG. 5, for an active code, i.e., a code that is used on a dedicated physical channel DPCH, the mean power at the time is found and shown as a function of the time, whereby the raster of the time slots of the pilot channel CPICH is also shown by the vertical dotted lines. Erratic changes in the power part of the respective code, which take place at the beginning of the pilot sequence shown crosshatched in FIG. 3, are thus able to be recognized in terms of their relative position within the time slot of the pilot channel CPICH.

On the other hand, with an inactive code shown in FIG. 6, according to the invention, not the power at the moment, but the mean power is found and shown, and the mean is taken via the length of a time slot of the pilot channel CPICH. Thus, if an inactive code is selected, in which codes in higher or lower code classes are mapped as alias power, power jumps can occur anywhere, since the codes in higher code classes can be moved any way in relation to the time slot of the pilot channel and the pilot sequences can have different lengths. But this has no effect on the depiction of the power, since the mean power is taken over the length of the time slot of the pilot channel CPICH and so power changes always fall at the limits of the time slots of the pilot channel. This results in a clear and interpretable view of the power parts of such codes, which are not active themselves, but whose assigned codes in higher classes are active.

What is claimed is:

1. A method of determining the power parts of the codes in different time slots (slot 0, slot 1, . . . ) of CDMA signals transmitted, which includes a pilot channel (CPICH) and at least one dedicated physical channel (DPCH), whereby different orthogonal codes are assigned to the pilot channel (CPICH) and the dedicated physical channels (DPCH), and the time slots (slot 14, slot 0, . . . ) of the dedicated physical channels (DPCH) can be shifted in time in relation to the time slots (slot 0, slot 1, . . . ) of the pilot channel (CPICH) with the following steps:

Select an orthogonal code whose power part is to be determined,

Determine whether the orthogonal code selected is active,

If the orthogonal code selected is active: determine the power part at the moment and display the mometary power part as a function of the time in the raster of time slots (slot 0, slot 1, . . . ) of the pilot channel (CPICH), and If the orthogonal code selected is not active: determine the mean power part using the length of the time slot (slot 0, slot 1, . . . ) of the pilot channel (CPICH) and display the mean power part as a function of the time in the raster of time slots (slot 0, slot 1, . . . ) of the pilot channel (CPICH).

2. The method in claim 1, characterized by the fact that the power parts for the orthogonal code in a certain code class (CC), i.e., for all codes with a certain spreading factor (SF), are determined.

3. The method in claim 2, characterized by the fact that the inactive orthogonal codes contain alias power parts of used orthogonal codes in a higher or lower code class (CC), and the mean power part represents the sum of the mean power parts of the used orthogonal codes in a higher code class (CC).

4. The method in one of claims 1 to 3, characterized by the fact that the power of each active dedicated physical channel (DPCH) is changed at the beginning of a pilot sequence (pilot) and the length of the pilot sequence (pilot) depends on the spreading factor (SF).

* * * * *